United States Patent [19]

Scholz

[11] 4,200,042
[45] Apr. 29, 1980

[54] NUT CRACKER

[76] Inventor: Julian W. Scholz, 3139 NE. 48th Ave., Portland, Oreg. 97213

[21] Appl. No.: 953,261

[22] Filed: Oct. 20, 1978

[51] Int. Cl.² ............................................. A23N 5/00
[52] U.S. Cl. ...................................... 99/582; 99/571; 99/583
[58] Field of Search ................. 99/568, 571, 572, 579, 99/581–583; 30/120.1–120.5; D7/98

[56] References Cited

U.S. PATENT DOCUMENTS

| | | | |
|---|---|---|---|
| 1,357,472 | 11/1920 | Randall | 99/582 |
| 4,009,651 | 3/1977 | Adams | 99/571 |

*Primary Examiner*—Harvey C. Hornsby
*Assistant Examiner*—Timothy F. Simone
*Attorney, Agent, or Firm*—Eugene M. Eckelman

[57] ABSTRACT

First and second levers are pivotally connected together at one end and have opposed portions provided with one or more cross grooves for receiving nuts to be cracked. These grooves have varying depth from one end to the other and also have varying width, thus accommodating a wide range of nut sizes. The grooves also have transverse ribs to hold nuts in place while being cracked. In a preferred structure, the grooves are defined by straight wall segments meeting in angular relation. One of the levers may comprise a base portion for seated support on a supporting surface, and the other lever may comprise a handle for applying leverage.

4 Claims, 5 Drawing Figures

U.S. Patent
Apr. 29, 1980
4,200,042
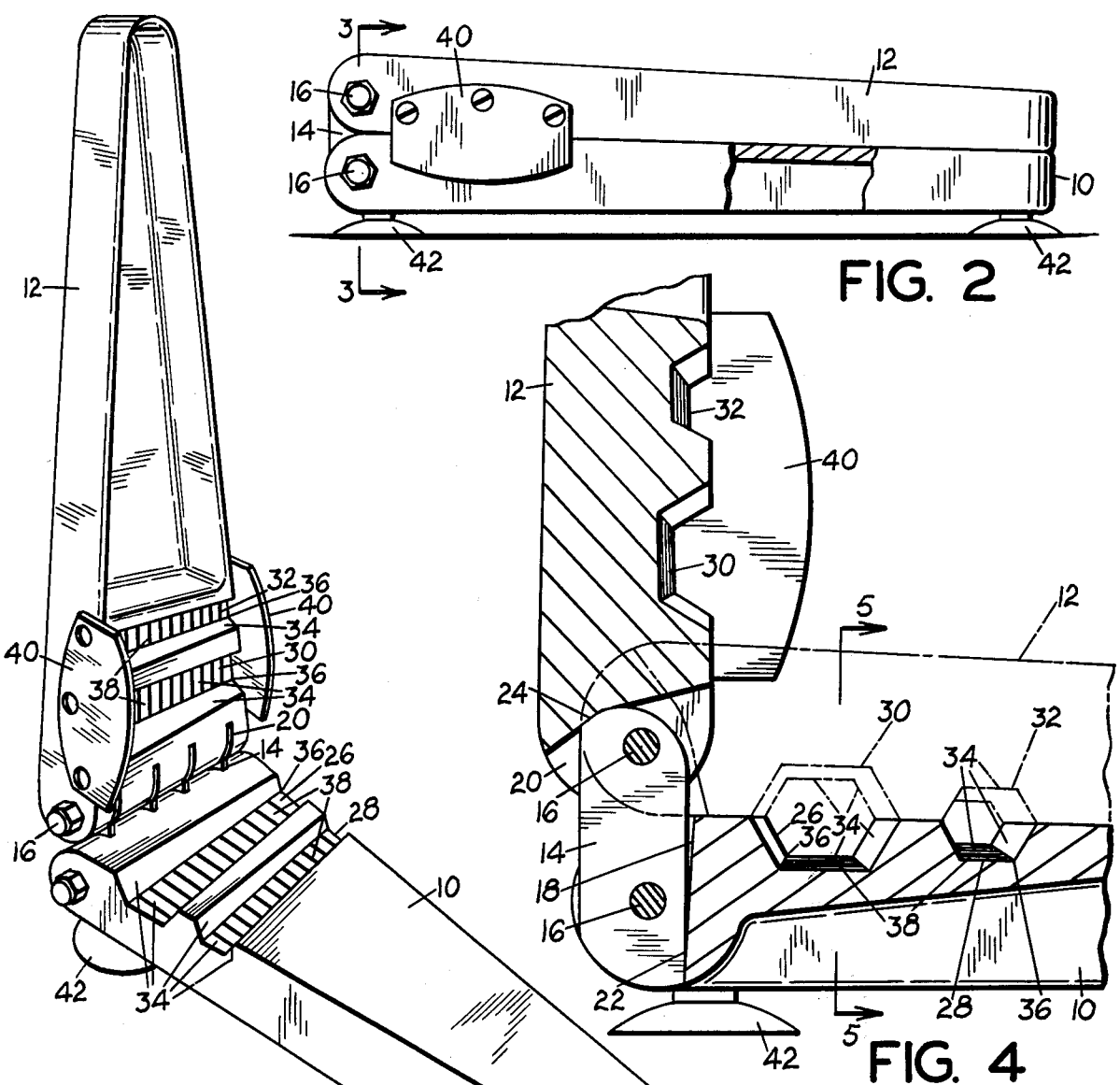
FIG. 2
FIG. 1
FIG. 4
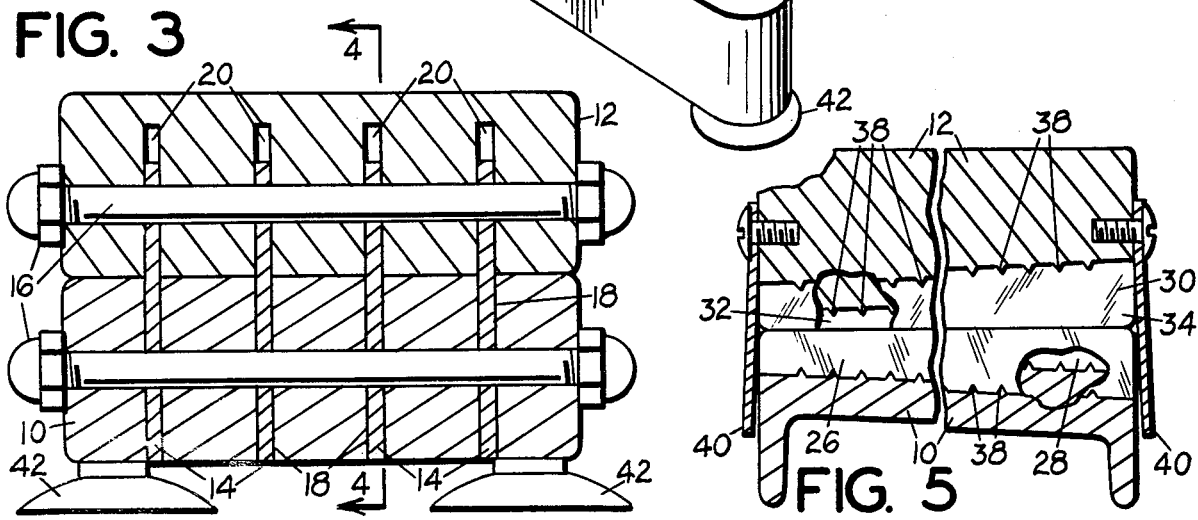
FIG. 3
FIG. 5

NUT CRACKER

This invention relates to new and useful improvements in nut cracking devices.

SUMMARY OF THE INVENTION

According to the present invention and forming a primary objective thereof, a nut cracker is provided having features which facilitate easy and efficient cracking of nuts and which accommodate a wide range of nut sizes.

In carrying out the objectives of the invention, first and second levers are pivotally connected together at one of their ends and have opposed portions arranged to be moved toward and away from each other upon pivotal movement of said levers. At least one of the opposed portions is provided with groove means for receiving the nuts to be cracked. Such groove means vary in depth and width from one end to the other. The groove means comprise matching aligned grooves in the two levers and are defined by straight wall portions meeting in angular relation. Said groove means have transverse ribs for holding the nuts in place while being cracked. One of said levers may comprise a base for support on a supporting surface and said other lever may comprise a handle for applying the nut cracking leverage.

The invention will be better understood and additional objects and advantages will become apparent from the following description taken in connection with the accompanying drawings which illustrate a preferred form of the invention.

BRIEF DESCRIPTION OF THE DRAWINGS

FIG. 1 is a perspective view of a nut cracker embodying features of the instant invention, the device in this view being open to receive a nut to be cracked;

FIG. 2 is a side elevational view, partly broken away and in reduced scale, of the instant invention, the device in this view being closed;

FIG. 3 is an enlarged sectional view taken on the line 3—3 of FIG. 2;

FIG. 4 is a fragmentary sectional view taken on the line 4—4 of FIG. 3, this sectional view being taken through the device in its open position; and FIG. 5 is a foreshortened sectional view taken on the line 5—5 of FIG. 4, this sectional view being taken through the device in its closed position.

DETAILED DESCRIPTION OF A PREFERRED EMBODIMENT

With particular reference to the drawings, the nut cracker of the invention comprises a first lever 10 and a second lever 12. These two levers are pivotally connected together at one end by means of a plurality of upright plates 14 connected at upper and lower ends to the levers by cross bolts 16 extending freely through said levers and plates. Plates 14 are disposed in end grooves 18 and 20 in the levers 10 and 12, respectively, and the pivotal connection of the two levers allows for rotating movement of the lever 12 into close or abutting relation with the lever 10 in a nut cracking function. Plates 14 and grooves 18 also limit opening pivotal movement of the lever 12 in that in such fully open position as shown in FIG. 4, the inner edges 22 of the plates 14 below their pivot point abut against the inner defining edges of grooves 18 and a straight top rear portion 24 of such plates are engaged by the inner defining edges of the grooves 20 in the lever 12.

Lever 10 is tapered to a greater width toward the pivot end, and a pair of grooves 26 and 28 are provided crosswise in this lever closely adjacent the widened pivot end. As best seen in FIG. 1, these grooves have a tapered width from one side of the device to the other and furthermore as seen in FIG. 5, they are tapered in depth. Lever 12 also tapers to a wider dimension toward the pivot end and includes cross grooves 30 and 32 which are in matching alignment and of similar dimension and shape in their tapered width and depth as grooves 26 and 28, respectively. In addition, grooves 26 and 30 are generally of greater dimension in width and depth than grooves 28 and 32 so that substantially all sizes of nuts can be accommodated.

In a preferred construction, the grooves 26, 28, 30 and 32 are formed by a plurality of straight wall sections 34, best seen in FIG. 4, meeting at distinct angles 36. The grooves, as defined by the straight walls and angle relation therebetween may, for example, form a hexagonal shape in cross section.

One or more of the wall portions 34 of each cross groove, preferably comprising opposed grooves such as the bottom wall portion of lever 10 and the top wall portion of lever 12, are provided with transverse ribs 38, FIGS. 1 and 5, for holding nuts in place while they are being cracked.

Lever 12 has a guard plate 40 mounted on each side thereof to cover the ends of the grooves 30 and 32. These plates project from lever 12 an amount so as to also cover the ends of grooves 26 and 28 during a lowered position of the lever 12. Plates 40 thus form guards to prevent shells and nut meat from traveling out the ends of the grooves. It is preferred that these guard plates be constructed of a semi-flexible material so as not to be dangerous to the hands of the person using the tool.

The present nut cracker preferably is used while supported on a table or the like, and for this purpose has suitable supporting feet 42 such as suction cups. The lever 10 will thus comprise a stationary base and the lever 12 will comprise a handle, thus forming a stable and easy to operate apparatus. The tapered construction of the handle 12 provides a ready grip for the operator. The use of the two tapered grooves in each of the levers, and more than two grooves may be used if desired, provides a nut cracker which can accommodate substantially any size of nut. It is merely necessary to place the nut in the desired groove and at the desired place in such groove to provide the best cracking function without ruining the meat of the nut. The multiple sided cavities formed by the grooves provide for efficient cracking of the nut with minimum damage to the meat. The close disposition of the grooves to the pivot point provides for maximum leverage with ease in operation.

It is to be understood that the form of my invention herein shown and described is to be taken as a preferred example of the same and that various other changes in the shape, size and arrangement of parts may be resorted to without departing from the spirit of my invention, or the scope of the subjoined claims.

Having thus described in my invention, I claim:
1. A nut cracker comprising
   (a) a first lever,
   (b) a second lever,
   (c) said levers having opposite ends and opposite sides,

(d) means pivotally connecting said levers together at one end,
(e) said levers having opposed surfaces arranged to move toward and away from each other upon pivotal movement of said levers,
(f) a groove in said surface of said first lever extending from one side of said lever to the other side,
(g) said groove tapering to a greater depth from one side of said lever to the other side and also tapering to a greater width from said one side of said lever to the other side,
(h) and a groove in said surface of said second lever extending from one side of said lever to the other side,
(i) the groove in the second lever tapering to a greater depth from one side of said lever to the other side and also tapering to a greater width from said one side of said lever to the other side,
(j) the groove in said second lever being in aligned cooperating arrangement with the groove in said first lever for receiving and cracking nuts when said levers are pivoted together,
(k) said two grooves being widened and deepened in their taper toward the same side of their respective levers whereby nuts of various sizes are arranged to be selectively placed in said grooves and cracked.

2. The nut cracker of claim 1 including a second set of opposed grooves in said surfaces, said second set of grooves being generally lesser in width and depth than said other grooves whereby to extend the range of nut size capable of being cracked, each of said second grooves being widened and deepened in their taper toward the same side as said other grooves.

3. The nut cracker of claim 2 wherein said grooves have ribs extending transversely thereof to hold nuts in place while being cracked.

4. The nut cracker of claim 2 including flexible plates secured to the sides of one of said first or second levers to cover the ends of said grooves at the sides of said levers.

* * * * *